United States Patent
Toyama

(10) Patent No.: US 6,670,778 B2
(45) Date of Patent: Dec. 30, 2003

(54) AC POWER GENERATING APPARATUS HAVING ELECTROLYTIC CAPACITOR AND CERAMIC CAPACITOR

(75) Inventor: Koichi Toyama, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/198,104

(22) Filed: Jul. 19, 2002

(65) Prior Publication Data

US 2003/0030385 A1 Feb. 13, 2003

(30) Foreign Application Priority Data

Aug. 7, 2001 (JP) ........................................ 2001-238979

(51) Int. Cl.[7] .............................................. H05B 41/16
(52) U.S. Cl. ........................................ 315/276; 315/224
(58) Field of Search .............................. 315/224, 225, 315/219, 276, 291, 307, 308, 282

(56) References Cited

U.S. PATENT DOCUMENTS 6,201,350 B1   3/2001  Okuchi et al. ................. 315/82
6,340,870 B1 * 1/2002  Yamashita et al. .......... 315/308
2003/0107329 A1 * 6/2003  Oshawa ....................... 315/276

FOREIGN PATENT DOCUMENTS

JP          A-10-295081         11/1998   ............ H02M/7/48

* cited by examiner

Primary Examiner—Hoang V. Nguyen
(74) Attorney, Agent, or Firm—Posz & Bethards, PLC

(57) ABSTRACT

An AC power generating apparatus for lighting a discharge lamp has a smoothing circuit with an electrolytic capacitor therein for smoothing ripples included in a DC voltage supplied from a power source. The apparatus further has a switching device and a transformer for transforming a smoothed voltage by turning on and off application of the smoothed voltage to the transformer thereby to supply AC electric power for activating a discharge lamp. A capacitor is connected in parallel with the electrolytic capacitor. This parallel capacitor is located inside an area surrounded by the transformer, the switching device and the electrolytic capacitor to reduce a circuit area where electromagnetic radiation noise is generated.

10 Claims, 4 Drawing Sheets

AC POWER GENERATING APPARATUS HAVING ELECTROLYTIC CAPACITOR AND CERAMIC CAPACITOR

CROSS REFERENCE TO RELATED APPLICATION

This application is based on and incorporates herein by reference Japanese Patent Application No. 2001-238979 filed on Aug. 7, 2001.

FIELD OF THE INVENTION

The present invention relates to an alternating current (AC) power generating apparatus that may be used for driving an electric load such as a discharge lamp or the like.

BACKGROUND OF THE INVENTION

In a conventional AC power generating apparatus such as a discharge lamp lighting apparatus disclosed in U.S. Pat. No. 6,201,350 B1, a DC-DC converter circuit and an inverter circuit are used. The DC-DC converter circuit includes therein a smoothing capacitor for elimination of noise signals, that is, ripple signals. An aluminum electrolytic capacitor is used as the smoothing capacitor, because the electrolytic capacitor is inexpensive and has large capacitance.

When current including large ripples flows in the electrolytic capacitor, the capacitor heats due to its internal series impedance in proportion to the square of the current including the ripples. As the capacitor heats, the internal pressure of the capacitor rises and tends to cause leak of the electrolytic solution in the capacitor. For this reason, the capacitor must be used under the predetermined allowable ripple current condition. As the allowable ripple current of the capacitor is depends on the volume of the capacitor, the capacitor for the lighting apparatus is necessarily sized large to sufficiently perform ripple eliminating performance.

The lighting apparatus further uses a transformer that forms a closed circuit with the capacitor and a switching transistor. The area surrounded by the parts forming the closed circuit is preferably small to minimize electromagnetic radiation noise. However, the large sized capacitor makes it impossible to reduce the area of the closed circuit. As a result, the electromagnetic radiation noise must be reduced by other measures such as electromagnetic shields.

SUMMARY OF THE INVENTION

It is therefore an object of the present invention to provide an AC power generating apparatus that supplies AC electric power to an electric load such as a discharge lamp stably in compact construction.

It is another object of the present invention to provide a discharge lamp lighting apparatus that reduces electromagnetic radiation noise.

According to the present invention, an apparatus comprises a smoothing circuit with an electrolytic capacitor therein for smoothing ripples included in a DC voltage supplied from a power source. The apparatus further comprises a switching device and a transformer for transforming a smoothed voltage by turning on and off application of the smoothed voltage to the transformer thereby to supply AC electric power for activating an electric load such as a discharge lamp. A capacitor is connected in parallel with the electrolytic capacitor.

Preferably, the parallel capacitor has an equivalent internal resistance that is smaller than that of the electrolytic capacitor. The parallel capacitor has a capacitance that is more than 2% of that of the electrolytic capacitor, and is a laminated ceramic type. The parallel capacitor is located inside an area surrounded by the transformer, the switching device and the electrolytic capacitor, so that a circuit area where electromagnetic radiation noise is generated is reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
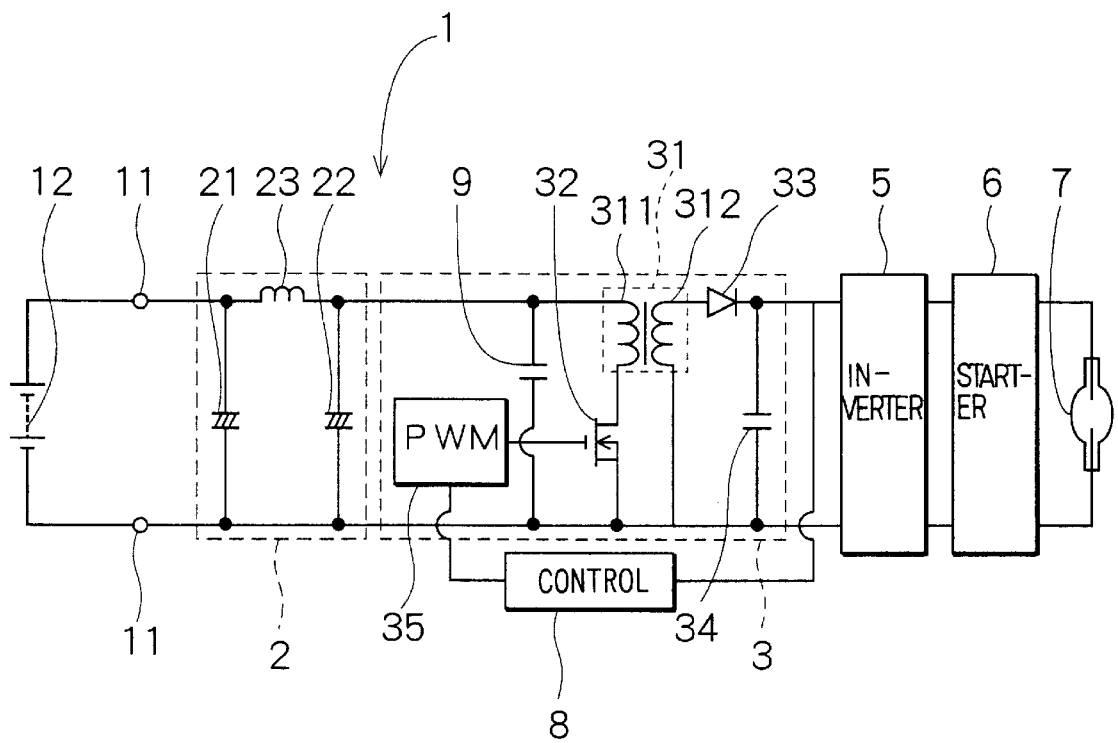
FIG. 1 is an electric circuit diagram showing a discharge lamp lighting apparatus according to the first embodiment of the present invention.
Figure 3:
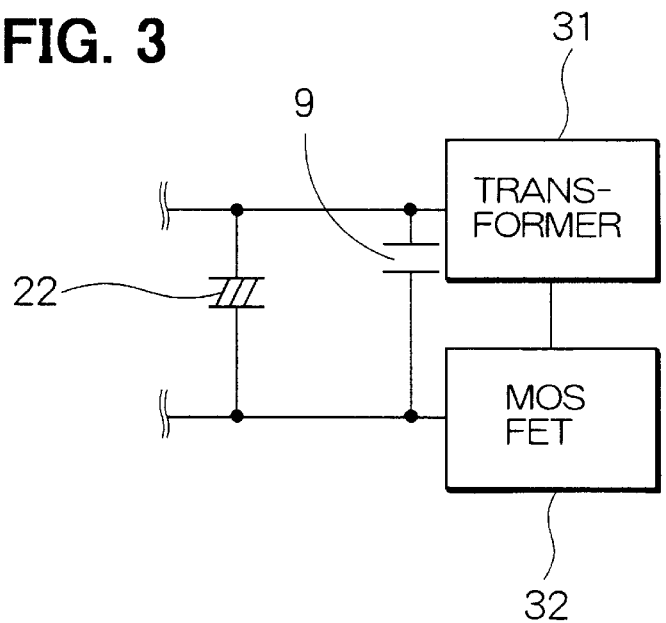
FIG. 3 is an electric circuit diagram showing a transformer, MOSFET and aluminum electrolytic capacitor forming a closed circuit in the first embodiment.
Figure 2:
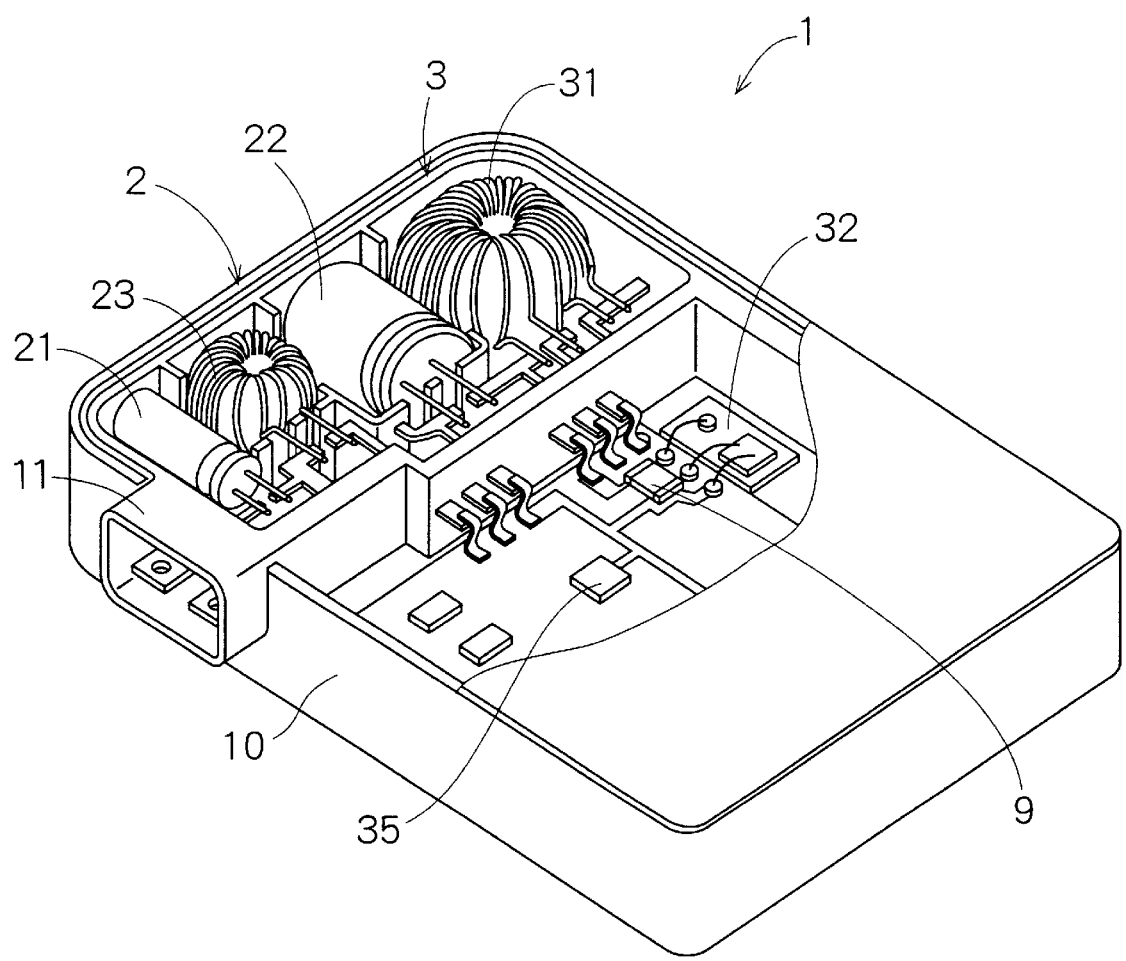
FIG. 2 is a schematic view showing the discharge lamp lighting apparatus shown in FIG. 1.

Referring first to FIG. 1, an AC power generating apparatus according to the first embodiment of the present invention is constructed as a discharge lamp lighting apparatus 1 for lighting a discharge lamp 7 such as a metal halide lamp used as a headlight of a vehicle. The apparatus 1 includes a smoothing circuit 2, a DC-DC converter circuit 3, an inverter circuit 5, a starter circuit 6 and a control circuit 8. The apparatus 1 is connected to a DC power source such as a storage battery 12 through a connector 11. Various electric circuit devices that form these circuits 2, 3, 5, 6, 8 are arranged within a casing 10 as shown in FIG. 2.

The smoothing circuit 2 is constructed with capacitors 21, 22 and a choke coil 23. The capacitor 22 is an aluminum electrolytic type. The smoothing circuit 2 eliminates ripples included in the DC voltage supplied from the power source 12 to the inverter circuit 3 by smoothing variations in the voltage and current.

The DC-DC converter 3 is constructed with a transformer 31, a metal oxide field effect transistor (MOSFET) 32 as a switching device, a rectifier diode 33, a capacitor 34 and a pulse width modulation (PWM) circuit 35. The transformer 31 has a primary coil 311 and a secondary coil 312. When the MOSFET 32 is turned on and off alternately by the PWM circuit 35 to allow and interrupt current flow in the primary coil 311, the secondary coil 312 induces an electromotive force voltage in the secondary coil 312. This voltage is rectified by the diode 33 and smoothed by the capacitor 34. The voltage of the secondary coil 312 varies with the duty ratio (ON-OFF ratio) of the MOSFET 32. The DC-DC converter circuit 3 thus converts the DC voltage of the power source 12 to a higher or lower voltage. With the smoothing circuit 2, the ripples in the voltage supplied to the primary coil 311 and the voltage supplied to the discharge lamp 7 from the capacitor 34 are reduced.

The inverter circuit 5 is provided to converter the DC voltage supplied from the DC-DC converter circuit 3 to an AC voltage to drive the discharge lamp 7. This circuit 5 may be a conventional full-bridge circuit that is constructed with a plurality of switching devices such as MOSFETs.

The starter circuit 6 is constructed with a transformer and a capacitor, although not shown, and generates a high starting voltage from the AC voltage supplied from the inverter circuit 5. This starting voltage is required for the discharge lamp 7 to start its discharging operation. After the discharge lamp 7 has started its discharging operation, the discharge lamp 7 maintains stable lighting operation.

The control circuit 8 is connected to the PWM circuit 35 and the inverter circuit 5. This circuit 8 calculates electric power consumed by the discharge lamp 7 and controls the inverter circuit 5 and the PWM circuit 35 to supply electric power required by the discharge lamp 7. Specifically, the PWM circuit 35 varies the duty ratio of the MOSFET 32 based on the calculated electric power and the electric power required by the discharge lamp 7 and the like.

In this embodiment, a laminated ceramic capacitor 9 is connected in parallel with the aluminum electrolytic capacitor 22 of the smoothing circuit 2. This ceramic capacitor 9 has equivalent series resistance $R_9$ smaller than that $R_{22}$ of the electrolytic capacitor 22. As shown in FIG. 1, 2, 3, the ceramic capacitor 9 is formed as a surface-mount type and disposed near the primary coil 311 of the transformer 31.

Figure 4:
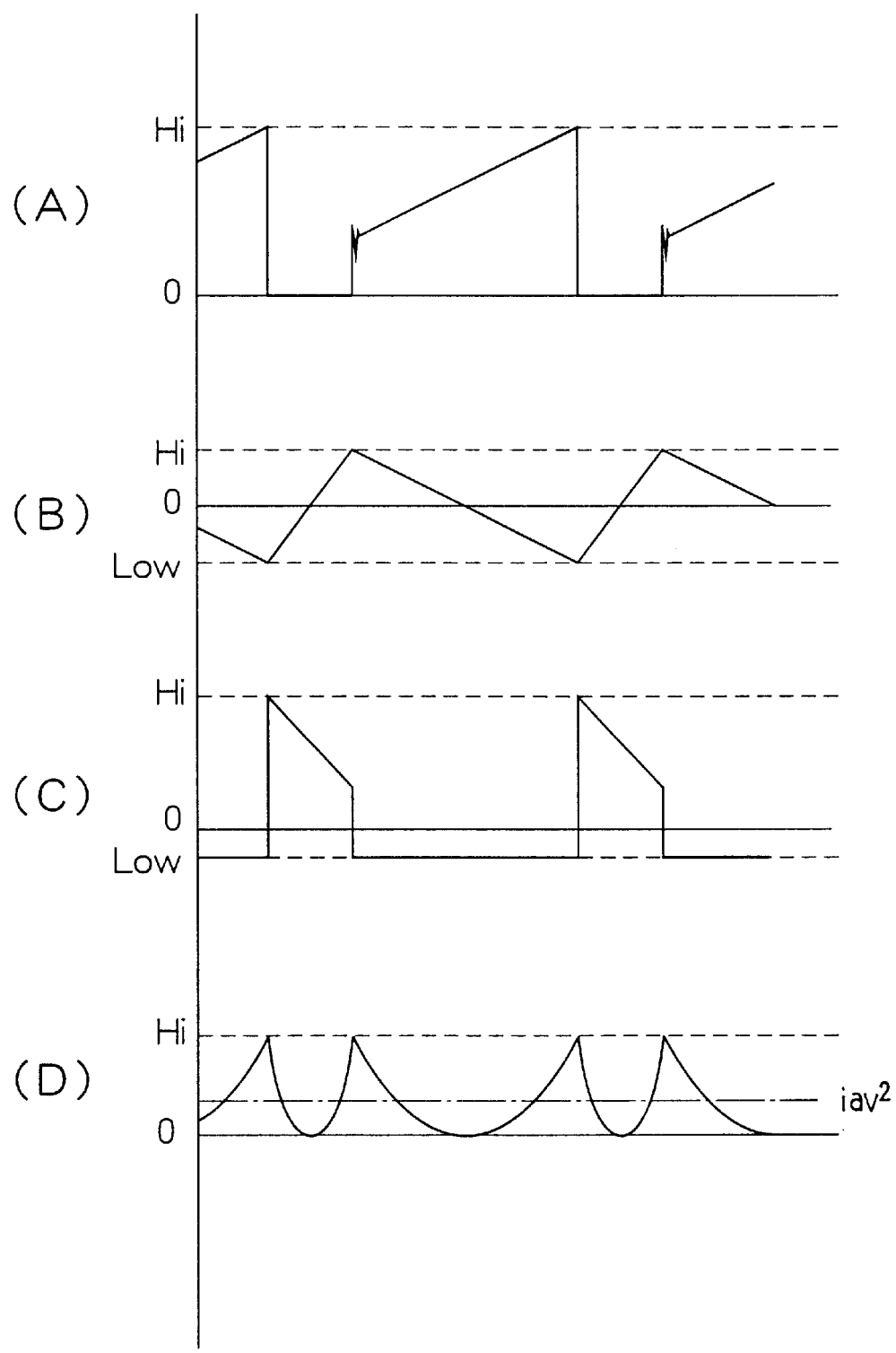
FIG. 4 is a signal diagram showing signals developed in the first embodiment.

In operation, since MOSFET 32 turns on and off alternately with the duty ratio determined by the PWM circuit 35, the current flowing in the MOSFET 32 changes as shown by (A) in FIG. 4. The ceramic capacitor 9 allows a current including ripples to flow therein as shown by (B) in FIG. 4. The electrolytic capacitor 22 also allows a current, which is reverse to that of the MOSFET 32, to flow therein as shown by (C) in FIG. 4. Since the current and ripples mostly flow in the capacitor 9, ripples in the current flowing in the electrolytic capacitor 22 is reduced.

The electrolytic capacitor 22 generates heat in proportion to the square of the current flowing therein due to its internal impedance. The square of this current and its average $i_{av}^2$ is shown by (D) of FIG. 4. These values are lower than those of the case in which the ceramic capacitor 9 is not provided, since the current flowing in the electrolytic capacitor 22 is reduced and includes less ripples.

Figure 5:
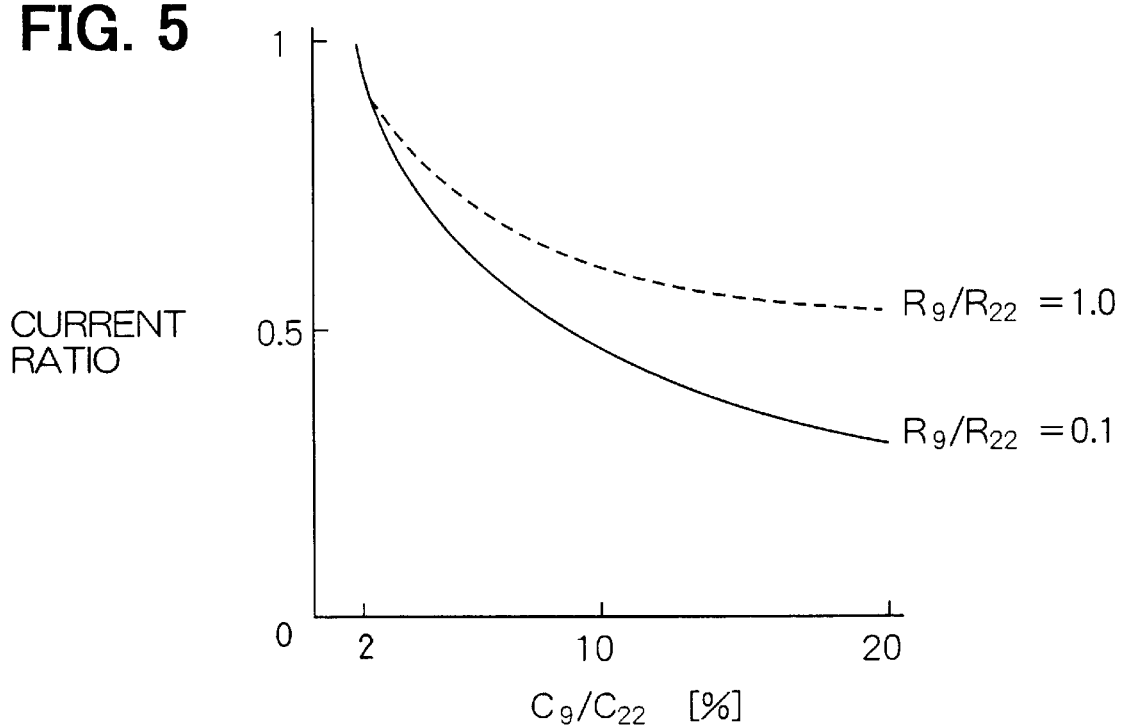
FIG. 5 is a graph showing the relation between a ratio of capacitors and a ratio of currents in the first embodiment.

The capacitors 9 and 22 have respective capacitances $C_9$ and $C_{22}$, and respective equivalent resistances $R_9$ and $R_{22}$ in this embodiment. The current including ripples that flows in the electrolytic capacitor 22 is shown in FIG. 5. Specifically, in this figure, the current of the capacitor 22 is shown as a ratio of current that flows in the capacitor 22 under the condition that the capacitor 9 is provided relative to the current that flows in the capacitor 22 under the condition that the capacitor 9 is not provided. That is, this current that flows without the capacitor 9 is assumed to be 1. Two current ratios are indicated with respect to different ratios ($R_9/R_{22}$) 1.0 and 0.1 of the equivalent series resistances $R_9$ and $R_{22}$ of the capacitors 9 and 22.

It is understood from FIG. 5 that, although the current ratio of current of the capacitor 22 varies with the series resistance $R_9$, the ripples included in the current of the capacitor 22 is effectively reduced by setting the capacitance ratio $C_9/C_{22}$ to be more than about 2%, preferably more than about 10%. The ripples may also be reduced by setting the resistance ratio $R_9/R_{22}$ to be small enough. As the series resistance $R_9$ of the capacitor 9 decreases, more current flows in the ceramic capacitor 9 than in the electrolytic capacitor 22. For this reason, the capacitance $C_9$ of the capacitor 9 is set to be smaller than the capacitance $C_{22}$ of the capacitor 22 but more than 2%, preferably more than about 10%, of the capacitance $C_{22}$ of the capacitor 22.

In this embodiment, as shown in FIGS. 1 and 2, the transformer 31, MOSFET 32 and the electrolytic capacitor 22 form a closed circuit, and the ceramic capacitor 9 is located inside the closed circuit. Specifically, as shown in FIG. 2, the ceramic capacitor 9 is located within the area surrounded by the electrolytic capacitor 22, transformer 31 and MOSFET 32. Since the ceramic capacitor 32 is the surface-mount type and small, it can be provided near the primary coil 311 without difficulty.

High frequency current flows in the closed circuit formed by the capacitor 22, transformer 31 and MOSFET 32 because of switching operation of the MOSFET 32. As the area surrounded by this closed circuit expands, the electromagnetic radiation noise generated by the current flowing in this closed circuit increases. It is therefore preferred to reduce the area of the closed circuit. For this purpose, the ceramic capacitor 9 of the surface-mount type is effective.

Figure 6:
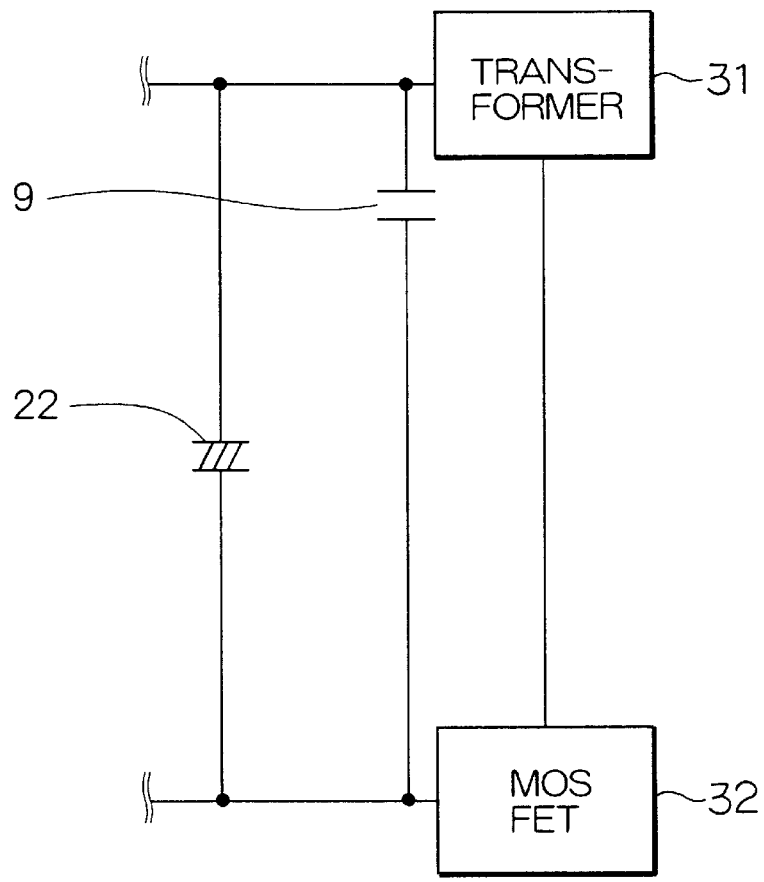
FIG. 6 is an electric circuit diagram showing a transformer, MOSFET and aluminum electrolytic capacitor forming a closed circuit in the second embodiment of the present invention.

According to the second embodiment, the transformer 31 and the MOSFET 32 that forms a part of the closed circuit are rather distanced from each other as shown in FIG. 6, resulting in a large area of the closed circuit. In this case, however, the area surrounded by a closed circuit formed by the ceramic capacitor 9, transformer 31 and MOSFET 32 is sized considerably smaller than that of the closed circuit formed by the electrolytic capacitor 22, transformer 31 and MOSFET 32. Since the high frequency current that causes electromagnetic radiation noise mostly flows in the ceramic capacitor 9. As a result, even if the transformer 31 and MOSFET 32 are distanced from each other, the area surrounded by the closed circuit of the high frequency circuit is maintained small, thus minimizing the electromagnetic radiation noise.

The present invention should not be limited to the disclosed embodiments but may be implemented in many other ways without departing from the spirit of the invention.

What is claimed is:

1. An apparatus for generating an AC electric power for lighting a discharge lamp with DC electric power from a DC power source, the apparatus comprising:

a smoothing circuit having an electrolytic capacitor for smoothing ripples included in a DC voltage supplied from the power source;

a DC-DC converter having a switching device and a transformer for transforming a smoothed voltage of the smoothing circuit by turning on and off application of the smoothed voltage to the transformer thereby to supply electric power for the discharge lamp; and a parallel capacitor connected in parallel with the electrolytic capacitor.

2. The apparatus as in claim 1, wherein the parallel capacitor has an equivalent internal resistance that is smaller than that of the electrolytic capacitor.

3. The apparatus as in claim 1, wherein the parallel capacitor has a capacitance that is more than 2% of that of the electrolytic capacitor.

4. The apparatus as in claim 1, wherein the parallel capacitor is a laminated ceramic type.

5. The apparatus as in claim 1, wherein the transformer, the switching device and the electrolytic capacitor form a closed circuit, and wherein the parallel capacitor is located inside an area of the closed circuit.

6. An apparatus for generating an AC voltage from a DC voltage of a DC power source, the apparatus comprising:

a first capacitor connected in parallel with the DC power source for smoothing ripples included in the DC voltage applied thereto;

a transformer having a primary coil and a secondary coil for generating the AC voltage from the secondary coil in response to intermittent application of a smoothed DC voltage to the primary coil;

a switching device connected in series with the primary coil of the transformer for alternately turning on and off to intermittently apply the smoothed DC voltage to the primary coil; and a second capacitor connected in parallel to the first capacitor, wherein the second capacitor is located in an area generally defined by the first capacitor, the primary coil and the switching device.

7. The apparatus as in claim 6, wherein the second capacitor is a surface-mount type that is different from that of the first capacitor.

8. The apparatus as in claim 7, wherein the second capacitor is a laminated ceramic type, and wherein the first capacitor is an aluminum electrolytic type.

9. The apparatus as in claim 6, wherein the second capacitor has an equivalent internal resistance that is smaller than that of the first capacitor.

10. The apparatus as in claim 6, wherein the second capacitor has a capacitance that is smaller than that of the first capacitor and more than about 10% of that of the first capacitor.

* * * * *